United States Patent
Hütsch et al.

(10) Patent No.: US 9,457,513 B2
(45) Date of Patent: Oct. 4, 2016

(54) FRICTION STIR WELDING TOOL

(71) Applicant: Helmholtz-Zentrum Geesthacht Zentrum für Material—und Küstenforschung GmbH, Geesthacht (DE)

(72) Inventors: Leon Leander Hütsch, Moosburg a. d. Isar (DE); Jannes Eckart, Hamburg (DE); Jorge Fernandez Dos Santos, Tespe (DE)

(73) Assignee: Helmholtz-Zentrum Geesthacht Zentrum für Material-und Küstenforschung GmbH, Geesthacht (DE)

( * ) Notice: Subject to any disclaimer, the term of this patent is extended or adjusted under 35 U.S.C. 154(b) by 0 days.

(21) Appl. No.: 14/845,536

(22) Filed: Sep. 4, 2015

(65) Prior Publication Data
US 2016/0067818 A1   Mar. 10, 2016

(30) Foreign Application Priority Data

Sep. 10, 2014 (EP) .................................... 14184331

(51) Int. Cl.
 *B32B 37/00* (2006.01)
 *B29C 65/06* (2006.01)
 *B23K 20/12* (2006.01)
(52) U.S. Cl.
 CPC ....... *B29C 65/0681* (2013.01); *B23K 20/1255* (2013.01)
(58) Field of Classification Search
 CPC . B29C 65/06; B29C 65/0681; B23K 20/122; B23K 20/1225; B23K 20/1245; B23K 20/1255
 USPC .................................................. 156/73.5, 580
 See application file for complete search history.

(56) References Cited

U.S. PATENT DOCUMENTS

| | | | | |
|---|---|---|---|---|
| 6,237,835 B1 * | 5/2001 | Litwinski | ........... | B23K 20/1255 228/112.1 |
| 8,052,028 B2 * | 11/2011 | Hall | ................... | B23K 20/1255 228/112.1 |

(Continued)

FOREIGN PATENT DOCUMENTS

| EP | 02639006 A1 | 9/2013 |
|---|---|---|
| WO | WO-2006/081819 A1 | 8/2006 |

OTHER PUBLICATIONS

European Search Report for corresponding European application EP14184331.8.

*Primary Examiner* — James Sells
(74) *Attorney, Agent, or Firm* — Harness, Dickey & Pierce, P.L.C.

(57) ABSTRACT

A friction stir welding tool having a drivable pin, which is rotatable around an axis, a shoulder element, a first shoulder and at least one spring. The pin includes a cylindrical engagement section that has a circumferential surface that engages a workpiece. The shoulder element includes a contact surface extending transversely to the axis for engagement with the workpiece. The shoulder element includes a friction block connected in a non-rotatable manner to the pin, on which a first friction surface is formed extending around the axis. The first shoulder part includes a second friction surface connected thereto in a non-rotatable manner, extending around the axis. The first and second friction surfaces face one another. The at least one spring biases the first friction surface against the second friction surface. The contact surface is formed on the first shoulder part.

18 Claims, 3 Drawing Sheets

(56) References Cited

U.S. PATENT DOCUMENTS

| | | | |
|---|---|---|---|
| 8,893,951 B2 * | 11/2014 | dos Santos | B23K 20/122 228/112.1 |
| 9,216,472 B2 * | 12/2015 | Sato | B23K 20/126 |
| 2009/0120995 A1 * | 5/2009 | Hallinan | B23K 20/1255 228/2.3 |

* cited by examiner

FRICTION STIR WELDING TOOL

CROSS-REFERENCE TO RELATED APPLICATIONS

This application claims the benefit and priority of European Patent Application No. 14184331.8, filed Sep. 10, 2014. The entire disclosure of the above application is incorporated herein by reference.

FIELD

The present disclosure relates to a friction stir welding tool.

BACKGROUND

This section provides background information related to the present disclosure which is not necessarily prior art.

Friction stir welding tools are well known from the prior art, wherein they allow butt joint connections to be realized in such a way that the two workpieces are initially laid next to each other along two edges and then the friction stir welding tool, while being rotationally driven around the rotation axis, is moved along the area of the edges lying next to each other across the workpieces, which is made possible by the fact that the rotation of the tool causes the plasticizing of the material of the workpieces in this area. In the process the engagement section of the pin initially engages with the edges of the workpieces, while the first and the second contact surfaces engage with the workpieces on their top side and bottom side respectively.

Depending on whether the contact surfaces or the shoulder elements on which they are provided are also rotationally driven, friction energy may additionally be introduced into the workpieces via the surfaces.

In this regard, it is known from the prior art to rotationally drive, independently of the pin, in particular the top shoulder provided on the side of the drive end of the engagement section, so that the first contact surface can rotate in the opposite direction or in the same direction as the pin.

Throughout this document, whenever reference is made hereafter to a "top" or a "bottom" shoulder element, it shall always be assumed that the friction stir welding tool is arranged such that the rotary drive for the pin is mounted above the pin. The "top shoulder" is then arranged closer to the rotary drive than an optionally provided "bottom" shoulder and, in particular, the "top" shoulder is arranged closer to the rotary drive than the engagement section. Thus, the terms "top" and "bottom" are to be understood as indicating a position relative to the rotary drive, with a top element being arranged closer to the rotary drive than an optionally also provided bottom element. The terms "top" and "bottom" do not necessarily indicate the spatial location, either.

Although, from a construction perspective, it has proven to be comparatively easy to rotationally drive, independently of the pin, the shoulder arranged at the top and adjacent to the rotary drive for the pin with the contact surface provided thereon, this is a very difficult task for a contact surface which is arranged on the bottom end or free end of the pin spaced apart from the rotary drive and thus on the side of the engagement section facing away from the rotary drive. In such arrangements, only hollow shaft assemblies may be used for the pin, and these are complicated to manufacture and, in addition, they often do not satisfy the strength requirements.

Indeed, it is desirable that the torque, which is transmitted from the pin to a shoulder element, which is provided on the side of the engagement section facing away from the rotary drive, can be limited, so that the friction energy introduced via the bottom contact surface can also be limited. It is also desirable that a device which permits such limiting of the friction energy introduced via the surface has a simple construction and functions reliably.

SUMMARY

This section provides a general summary of the disclosure, and is not a comprehensive disclosure of its full scope or all of its features.

In one form, the present teachings provide a friction stir welding tool in which the friction energy introduced via a shoulder element, with a contact surface extending transversely to the rotation axis, can be easily limited.

This can be achieved, for example, by the shoulder element having a friction block connected in a non-rotatable manner to the pin, on which a first friction surface is formed extending around the rotation axis, by providing a first shoulder part which includes, connected thereto in a non-rotatable manner, a second friction surface extending around the rotation axis, by the first and the second friction surfaces being arranged in such a way that they face one another, by providing biasing means, which bias the first friction surface against the second friction surface, and by forming the contact surface on the first shoulder part.

The shoulder part, which is arranged on one side of the engagement section, is therefore coupled in a frictionally engaged manner to the pin, so that when the torque to be transmitted exceeds a pre-defined threshold, which is determined by the bias of the biasing means, the shoulder part is no longer rotationally driven. In this way, the maximum friction energy that may be introduced into the workpiece surface is limited. This requires only mechanical components, namely the biasing means.

The friction stir welding tool can be provided with a second contact surface extending transversely to the rotation axis, which faces the contact surface on the first shoulder part, wherein the engagement section is arranged between the contact surfaces. In this case, workpieces can be accommodated between the two contact surfaces, so that friction energy can be introduced via both surfaces of the workpieces thereto.

The first and the second friction surfaces can be designed as surfaces which are inclined relative to the rotation axis and which extend around the rotation axis. Such an arrangement can be easily realized from a construction perspective, and the biasing can then occur via an axial force, so that the tool as a whole occupies a relatively small space. In another preferred embodiment, the second friction surface is formed on a first ring element which is held in a non-rotatable manner and axially displaceable in relation to the rotation axis relative to the first shoulder part. This allows the shoulder part itself to be held axially, non-displaceably on the pin, and allows the axial position in relation to the engagement section to be predefined for the contact surface. In such a design it may be desirable that the biasing means are designed as a spring element arranged between the first shoulder part and the first ring element, wherein the spring element biases the first ring element axially in relation to the rotation axis towards the friction block.

The contact surface can be formed on a contact element detachably held on the first shoulder part. In this case, in the event of wear in the contact surface area, only the contact element needs to be replaced, while the rest of the structure, which forms the frictional-locking connection between the pin and the contact surface, needs not to be replaced.

A third friction surface extending around the rotation axis can be formed on the friction block, which can be non-rotatable or formed as an integral part of the pin, wherein a second shoulder part is provided, which includes a fourth friction surface connected thereto in a non-rotatable manner and extending around the rotation axis, wherein the third and the fourth friction surfaces are arranged in such a way that they face one another, and wherein biasing means are provided, which bias the third friction surface against the fourth friction surface. In such an arrangement, on both sides of the friction block when viewed in the axial direction of the pin, shoulder parts can be arranged, the friction surfaces of which are then biased in the axial direction in each case against the friction surfaces on the friction block. A symmetrical arrangement of this kind works particularly reliably, and the problem of needing a support for the biasing means does not arise. Instead, these are supported in each case in one direction on the element carrying the second or the fourth friction surface, respectively, or otherwise on the first and second shoulder parts. Optionally, the third and the fourth friction surfaces can be designed as surfaces which are inclined relative to the rotation axis and which extend around the rotation axis, wherein the fourth friction surface is then again formed on a second ring element which is held in a non-rotatable manner, but axially displaceable in relation to the rotation axis relative to the second shoulder part, and wherein a second spring element is provided between the second shoulder part and the second ring element, which second spring element biases the second ring element axially towards the friction block. In this embodiment, a compact design is also achieved for the second shoulder part.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
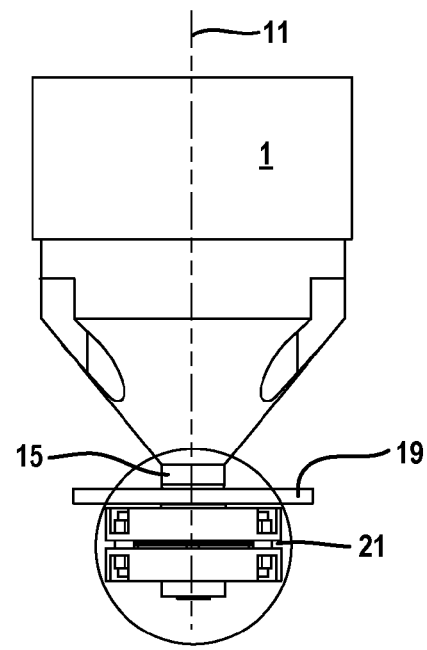
FIG. 1 is a friction stir welding mechanism with a first exemplary friction stir welding tool according to the teachings of the present disclosure.
Figure 2:
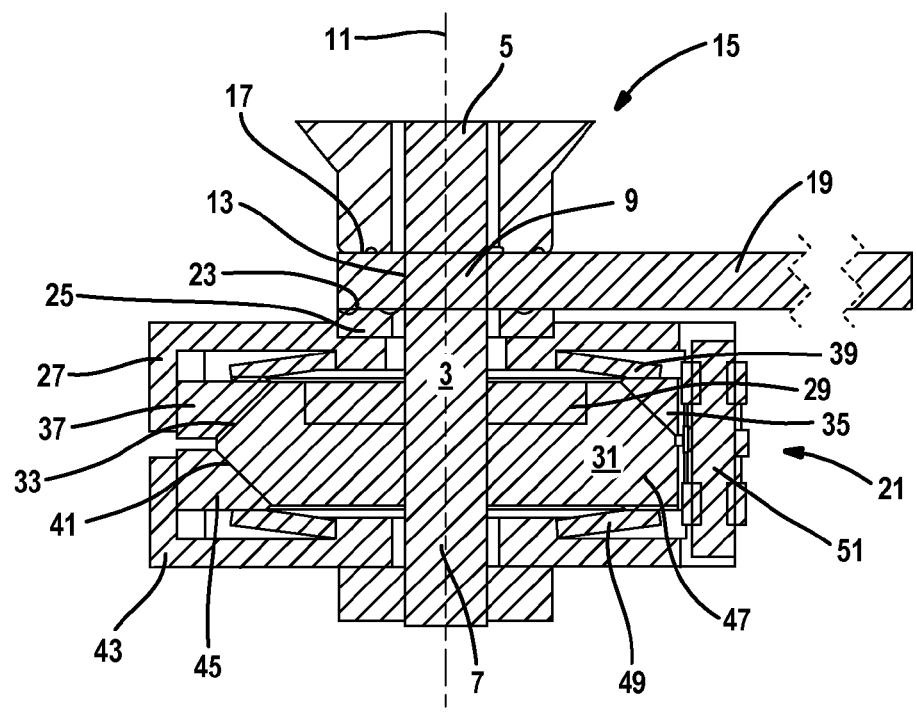
FIG. 2 is an enlarged portion the friction stir welding tool of FIG. 1.

A friction stir welding mechanism with a friction stir welding tool according to the teachings of the present disclosure is shown in FIGS. 1 and 2 as including a drive 1 provided on a handling device (not shown), by means of which drive a pin 3 of the friction stir welding tool can be rotationally driven, wherein a drive end 5 of the pin 3 is coupled to the drive 1.

Between the drive end 5 and a free end 7 of the pin 3 spaced apart therefrom, an engagement section 9 is formed on the pin 3, which has a cylindrical shape and which is provided with an engagement surface 13 extending parallel to the rotation axis 11 of the pin 3. A first shoulder element 15 is provided in the area of the drive end 5 of the pin 3, which surrounds the pin 3 and includes a first contact surface 17 extending transversely and in particular perpendicularly to the rotation axis 11, which first contact surface is intended to lie against the surface of a workpiece 19. The first shoulder element 15 is, in this preferred exemplary embodiment, rotationally driven around the rotation axis 11 separately from the pin 3. It is also conceivable, however, that the first shoulder element 15 is connected in a non-rotatable manner to the pin 3 or is even formed as an integral part thereof, so that it rotates together with the pin 3.

On the side of the engagement section 9 which faces the first shoulder element 15 with the first contact surface 17, a second shoulder element 21 is mounted on the pin 3, wherein the second shoulder element 21 includes a second contact surface 23 facing the first contact surface 17, which second contact surface also extends transversely and in particular perpendicularly to the rotation axis 11. The second contact surface 23 is formed on a contact element 25, which is detachably mounted on a first shoulder part 27.

In addition, a friction block 31 is held on the pin 3 in a non-rotatable manner by means of an engagement element 29, which friction block includes a first friction surface 33 which is inclined relative to the rotation axis 11 and which extends around this rotation axis and which faces outwardly. The first friction surface 33 faces a second friction surface 35, which likewise is inclined relative to the rotation axis 11 and which extends around same, wherein the second friction surface 35 is formed on a first ring element 37, which is held on the first shoulder part 27 in a non-rotatable manner, but axially displaceable in the direction of the rotation axis 11. The first ring element 37 is biased by a disk spring 39, which is supported on the first shoulder part 27, in the axial direction towards the friction block 31, so that the friction surfaces 33, 35 are also biased towards one another.

A third friction surface 41 is also provided on the friction block 31, which is inclined relative to the rotation axis 11 and which extends around same. Furthermore, a second shoulder part 43 is provided on the second shoulder element 21, which is coupled in an axially displaceable, but non-rotatable manner to a second ring element 45, on which a fourth friction surface 47 is formed, facing inwardly and inclined relative to the rotation axis 11. The second ring element 45 is biased via a second disk spring 49 in the axial direction towards the friction block 31, so that the third and fourth friction surfaces 41, 47 are also biased against one another.

Finally, the first shoulder part 27 and the second shoulder part 43 are connected in a non-rotatable manner to one another via bolts 51, onto which nuts are screwed, and the axial distance between the two of them is determined by the bolts 51 with the nuts screwed onto them. In addition, by means of the nuts it is possible to adjust the bias of the disk springs 39, 49, with which these friction surfaces 33, 35, 41, 47 are biased against one another.

Using the first exemplary embodiment of a friction stir welding tool according to the invention, a friction stir weld seam can be produced in the workpiece 19 in the manner described below.

The engagement section 9 of the friction stir welding tool is brought to bear on an edge of the workpiece 19, and the first contact surface 17 of the first shoulder element 15 rests on the top surface of the workpiece 19, while the second contact surface 23 on the second shoulder element 21 abuts the bottom surface of the workpiece 19.

When the pin 3 and the first shoulder element 15 are rotationally driven, on the one hand, the engagement surface 13 of the engagement section 9 rubs against the edge of the workpiece 19, and on the other hand, the first contact surface 17 and the second contact surface 23 rub against the surface of the workpiece 19, so that friction energy is introduced into it and the area around the friction stir welding tool is plasticized. Thus the tool can be moved further across the workpiece 19, and a friction stir weld seam can be produced. This process is known per se.

When the torque, which is transmitted from the pin 3 to the second shoulder element 21 and, thus, to the second contact surface 23, exceeds a pre-defined threshold, which is determined by the bias of the disk springs 39, 49 and can, thus, be adjusted by means of the bolt and the nut, the friction surfaces 33, 35 and 41, 47 glide over one another, so that then the shoulder parts 27, 43 and the contact element 25 provided on the first shoulder part 27 no longer rotate too, so that at least via the second contact surface 23 no more friction energy resulting from its rotation is introduced into the workpiece 19. The friction resulting from the linear movement of the second contact surface 23 remains, however.

In the exemplary embodiment described here, the bottom second shoulder element 21 of the friction stir welding tool, spaced apart from the rotary drive 1, is coupled in a frictionally engaged manner to the pin 3. However, it is equally conceivable that this is also the case for the first top shoulder element 15 and that it is not driven independently of the pin 3, but instead is also connected in a frictionally engaged manner to the pin 3. It is also possible for only the first top shoulder element to be coupled in the frictionally engaged manner described to the pin 3, in order to thus limit the friction energy introduced via this shoulder element.

Figure 3:
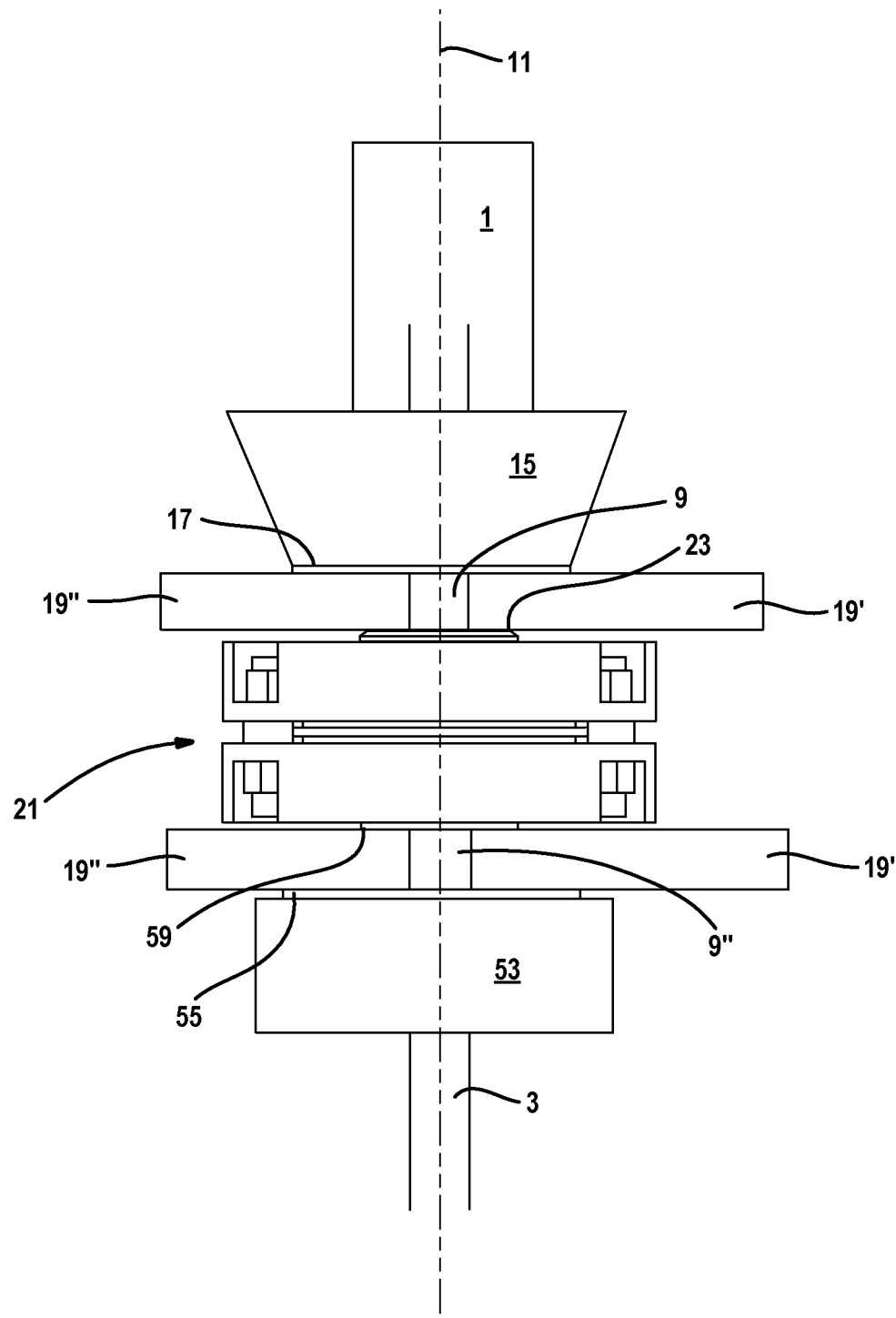
FIG. 3 is a side view of a second exemplary friction stir welding tool according to the teachings of the present disclosure.
Figure 4:
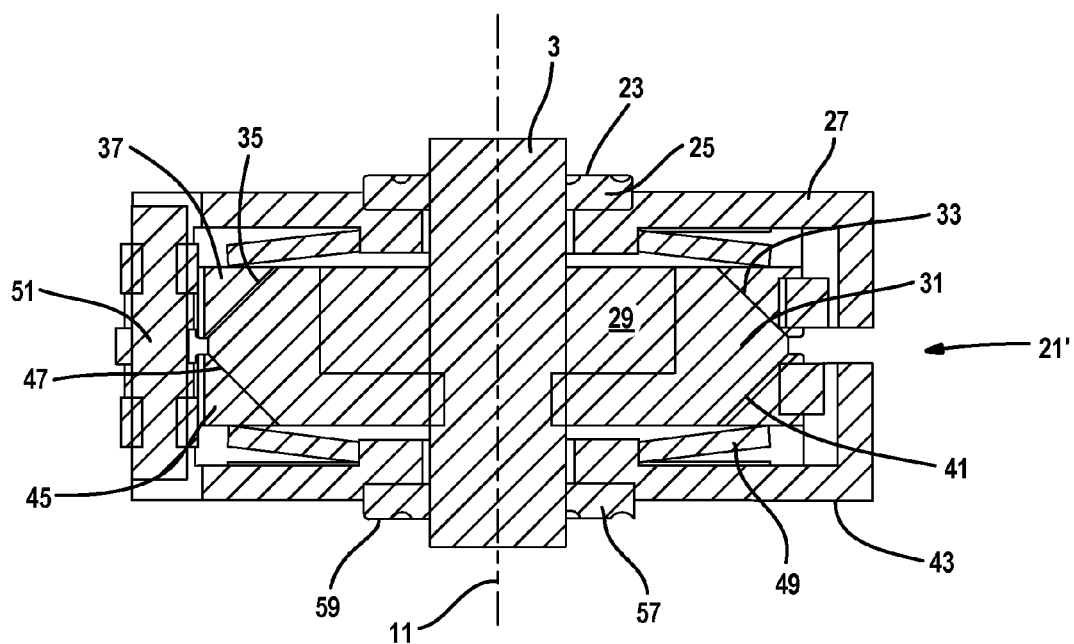
FIG. 4 is an enlarged portion of the friction stir welding tool of FIG. 3.

The second exemplary embodiment of a friction stir welding tool according to the invention shown in FIGS. 3 and 4 is designed to weld box profiles with a first workpiece section 19' and a second workpiece section 19", extending parallel thereto.

It is also connected to a drive 1 for the pin 3, wherein the pin 3 here includes a first engagement section 9' and a second engagement section 9", on which engagement surfaces extending parallel to the rotation axis 11 are formed. A first shoulder element 15 and a third shoulder element 53 are arranged on the pin 3 in a non-rotatable manner, wherein a first contact surface 17 extending transversely to the rotation axis 11 and facing the second engagement section 9' is formed on the first shoulder element 15. In a similar way, a third contact surface 55 facing the second engagement section 9" and likewise extending transversely to the rotation axis 11 is formed on the third shoulder element 53.

The contact surfaces 17, 55 and the engagement sections 9', 9" are designed, as already described in relation to the first exemplary embodiment, to be brought in contact with the workpiece sections 19', 19" so that, when the pin 3 is rotationally driven by means of the drive 1, both the contact surfaces 17, 55 and also the engagement sections 9', 9" come into frictional contact with the workpiece sections 19', 19".

A second shoulder element 21 is arranged between the first engagement section 9' and the second engagement section 9", which, once again, is coupled in a frictionally engaged manner to the pin 3. For this purpose, the second shoulder element 21' is, as shown in FIG. 4, designed in such a way that it again includes a friction block 31 which is held in a non-rotatable manner by means of an engagement element 29 on the pin 3, which friction block extends in a ring shape around the pin 3. A first friction surface 33 inclined relative to the rotation axis 11 and extending in a ring shape around the rotation axis 11, is formed on the friction block 31. A third friction surface 41 also inclined relative to the rotation axis 11 and also extending in a ring shape around the pin 3 is also provided on the friction block 31, wherein both the first friction surface 33 and the second friction surface 41 face radially outwardly, away from the rotation axis 11.

In addition, the second shoulder element 21' includes a first shoulder part 27, which is disposed annularly around the pin 3 and which includes the second contact surface 23 formed on a first contact element 25 detachably held thereon, which second contact surface here too extends transversely, and in particular perpendicularly, to the rotation axis 11. A first ring element 37 is also provided on the first shoulder part 27, which is displaceable in the axial direction in relation to the rotation axis 11, but held thereon in a non-rotatable manner, which first ring element includes a second friction surface 35, which is inclined relative to the rotation axis 11 and faces the first friction surface 33. Finally, a first disk spring 39 is provided between the first shoulder part 27 and the first ring element 37, which disk spring biases the first ring element 37 in the axial direction in relation to the rotation axis 11 in such a way that the first and the second friction surfaces 33, 35 are pressed against one another with a bias determined by the deformation of the first disk spring 39.

In addition, the second shoulder element 21' includes a second shoulder part 43, which is also disposed annularly around the pin 3 and on which a fourth contact surface 59 is formed by means of a second contact element 57 detachably held thereon. A second ring element 45 is provided on the second shoulder part 43, which is also axially displaceable in relation to the rotation axis 11, but held on the second shoulder part 43 in a non-rotatable manner, wherein the second ring element 45 includes a fourth friction surface 47 inclined relative to the rotation axis 11 and extending in a ring shape around same. In the process the fourth friction surface 47 faces the second friction surface 35 formed on the friction block 31, and the second ring element 45 is biased by means of a second disk spring 49 in the axial direction towards the friction block 31.

Finally, the shoulder parts 27, 43 are, here too, clamped against one another by means of threaded bolts 51 and nuts screwed onto them, thus determining the bias which the disk springs 39, 49 apply to the ring elements 37, 45, and thus, in turn, the strength of the frictional engagement between the ring elements 37, 45 and the friction block 31 can be adjusted.

In the second exemplary embodiment of a friction stir welding tool shown in FIGS. 3 and 4, when welding two workpiece sections 19', 19" to form a box-shaped profile, the first and the third contact surfaces 17, 55 are brought in contact with the outwardly facing surfaces of the workpiece parts 19', 19", wherein, by means of the rotational drive of the first and of the third shoulder elements 15, 53, due to the non-rotatable connection to the pin 3, frictional heat is produced in the workpiece sections 19', 19", even in the area of their outwardly facing surfaces. In addition, the second and the fourth contact surfaces 23, 59 of the second shoulder element 21' lie against the inwardly facing surfaces of the workpiece sections 19', 19'', wherein, however, due to the selected bias of the disk springs 39, 49, only a defined torque can be transmitted from the pin 3 to the contact surfaces 23, 59, as a frictionally engaged connection exists here.

Thus, here too, the maximum friction energy transmitted from the second shoulder element 21' is limited, so that in this way, on the one hand, the heat introduction into the workpiece sections 19', 19'', and also, on the other hand, the stressing of the pin 3 caused by the torque transmission to the second shoulder element 21' are limited.

Overall, in the described exemplary embodiments, in each case the friction energy introduced via a shoulder element 21, 21' is limited by means of the frictional locking engagement between the pin 3 and a part of the shoulder element. Such a construction can be easily realized and functions extremely reliably.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A friction stir welding tool comprising:
    a drivable pin configured for rotation around a rotation axis, the pin having a drive end, which is adapted for coupling to a rotary drive, a free end, and a cylindrical engagement section between the drive end and the free end, the cylindrical engagement section having a circumferential surface, which is adapted to engage with a workpiece,
    a shoulder element that faces the engagement section, the shoulder element having a contact surface and a friction block, the contact surface extending transversely to the rotation axis and being configured to engage with the workpiece, the friction block being non-rotatably connected to the pin and having a first friction surface that extends around the rotation axis,
    a first shoulder part having a second friction surface that extends around the rotation axis, and
    at least one spring that biases the first friction surface against the second friction surface,
    wherein the first and second friction surfaces are arranged in such a way that they face one another, and
    wherein the contact surface is formed on the first shoulder part.

2. The friction stir welding tool of claim 1, wherein the first and the second friction surfaces are inclined relative to the rotation axis and extend around the rotation axis.

3. The friction stir welding tool of claim 2, wherein the second friction surface is formed on a first ring element which is held in a non-rotatable manner and axially displaceable in relation to the rotation axis relative to the first shoulder part.

4. The friction stir welding tool of claim 3, wherein the at least one spring comprises a spring element between the first shoulder part and the first ring element, and wherein the spring element biases the first ring element axially in relation to the rotation axis towards the friction block.

5. The friction stir welding tool of claim 4, wherein the contact surface is formed on a contact element detachably held on the first shoulder part.

6. The friction stir welding tool of claim 5, further comprising a second shoulder part, wherein a third friction surface is formed on the friction block and extends around the rotation axis, wherein the second shoulder part includes a fourth friction surface that extends around the rotation axis, wherein the third and the fourth friction surfaces face one another, and wherein the at least one spring biases the third friction surface against the fourth friction surface.

7. The friction stir welding tool of claim 6, wherein the third and the fourth friction surfaces are inclined relative to the rotation axis and extend around the rotation axis, wherein the fourth friction surface faces the third friction surface and is formed on a second ring element, the second ring element being held in a non-rotatable manner and axially displaceable in relation to the rotation axis relative to the second shoulder part, and wherein the at least one spring comprises a second spring element that is disposed between the second shoulder part and the second ring element, the second spring element biasing the second ring element axially in relation to the rotation axis towards the friction block.

8. The friction stir welding tool of claim 7, further comprising having a second contact surface extending transversely to the rotation axis, the second contact surface facing faces the contact surface on the first shoulder part, wherein the engagement section is arranged between the contact surface and the second contact surface.

9. The friction stir welding tool of claim 2, wherein the contact surface is formed on a contact element detachably held on the first shoulder part.

10. The friction stir welding tool of claim 2, further comprising a second shoulder part, wherein a third friction surface is formed on the friction block and extends around the rotation axis, wherein the second shoulder part includes a fourth friction surface that extends around the rotation axis, wherein the third and the fourth friction surfaces face one another, and wherein the at least one spring biases the third friction surface against the fourth friction surface.

11. The friction stir welding tool of claim 10, wherein the third and the fourth friction surfaces are inclined relative to the rotation axis and extend around the rotation axis, wherein the fourth friction surface faces the third friction surface and is formed on a second ring element, the second ring element being held in a non-rotatable manner and axially displaceable in relation to the rotation axis relative to the second shoulder part, and wherein the at least one spring comprises a second spring element that is disposed between the second shoulder part and the second ring element, the second spring element biasing the second ring element axially in relation to the rotation axis towards the friction block.

12. The friction stir welding tool of claim 2, further comprising having a second contact surface extending transversely to the rotation axis, the second contact surface facing faces the contact surface on the first shoulder part, wherein the engagement section is arranged between the contact surface and the second contact surface.

13. The friction stir welding tool of claim 1, wherein the second friction surface is formed on a first ring element which is held in a non-rotatable manner and axially displaceable in relation to the rotation axis relative to the first shoulder part.

14. The friction stir welding tool of claim 13, wherein the at least one spring comprises a spring element between the first shoulder part and the first ring element, and wherein the spring element biases the first ring element axially in relation to the rotation axis towards the friction block.

15. The friction stir welding tool of claim 1, wherein the contact surface is formed on a contact element detachably held on the first shoulder part.

16. The friction stir welding tool of claim 1, further comprising a second shoulder part, wherein a third friction surface is formed on the friction block and extends around the rotation axis, wherein the second shoulder part includes a fourth friction surface that extends around the rotation axis, wherein the third and the fourth friction surfaces face one another, and wherein the at least one spring biases the third friction surface against the fourth friction surface.

17. The friction stir welding tool of claim 16, wherein the third and the fourth friction surfaces are inclined relative to the rotation axis and extend around the rotation axis, wherein the fourth friction surface faces the third friction surface and is formed on a second ring element, the second ring element being held in a non-rotatable manner and axially displaceable in relation to the rotation axis relative to the second shoulder part, and wherein the at least one spring comprises a second spring element that is disposed between the second shoulder part and the second ring element, the second spring element biasing the second ring element axially in relation to the rotation axis towards the friction block.

18. The friction stir welding tool of claim 1, further comprising having a second contact surface extending transversely to the rotation axis, the second contact surface facing faces the contact surface on the first shoulder part, wherein the engagement section is arranged between the contact surface and the second contact surface.

* * * * *